(12) United States Patent
Watanabe et al.

(10) Patent No.: US 8,265,828 B2
(45) Date of Patent: Sep. 11, 2012

(54) CONTROL APPARATUS FOR ELECTRIC POWER STEERING SYSTEM

(75) Inventors: Daiji Watanabe, Nagoya (JP); Motoaki Kataoka, Kariya (JP); Tomoyuki Hori, Handa (JP)

(73) Assignee: DENSO CORPORATION, Kariya (JP)

( * ) Notice: Subject to any disclaimer, the term of this patent is extended or adjusted under 35 U.S.C. 154(b) by 259 days.

(21) Appl. No.: 12/800,458

(22) Filed: May 14, 2010

(65) Prior Publication Data

US 2010/0292896 A1 Nov. 18, 2010

(30) Foreign Application Priority Data

May 15, 2009 (JP) ................................ 2009-118805

(51) Int. Cl.
*A01B 69/00* (2006.01)
(52) U.S. Cl. ........... 701/41; 180/6.44; 180/6.6; 180/234
(58) Field of Classification Search ................ 701/41; 180/6.44, 6.6, 234
See application file for complete search history.

(56) References Cited

U.S. PATENT DOCUMENTS

| | | | |
|---|---|---|---|
| 6,838,846 B2 * | 1/2005 | Matsuoka | 318/432 |
| 6,907,334 B2 * | 6/2005 | Yoshida et al. | 701/41 |
| 7,009,358 B2 * | 3/2006 | Tamaizumi et al. | 318/632 |
| 7,546,191 B2 * | 6/2009 | Lin et al. | 701/42 |
| 7,974,752 B2 * | 7/2011 | Yamashita et al. | 701/41 |
| 8,140,222 B2 * | 3/2012 | Watanabe et al. | 701/41 |
| 2002/0056587 A1 * | 5/2002 | Shibasaki et al. | 180/443 |
| 2003/0052639 A1 | 3/2003 | Tanaka et al. | |
| 2003/0102181 A1 * | 6/2003 | Tokumoto | 180/446 |
| 2004/0061465 A1 | 4/2004 | Matsuoka | |
| 2006/0017413 A1 | 1/2006 | Okamoto et al. | |
| 2006/0273247 A1 * | 12/2006 | Sakamaki et al. | 250/231.13 |
| 2007/0100524 A1 | 5/2007 | Sakaguchi et al. | |
| 2008/0027609 A1 * | 1/2008 | Aoki et al. | 701/43 |

FOREIGN PATENT DOCUMENTS

| | | |
|---|---|---|
| DE | 102006051747 | 5/2007 |
| JP | 10-016809 | 1/1998 |
| JP | 2003-072577 | 3/2003 |
| JP | 2004-042691 | 2/2004 |
| JP | 2006-168649 | 6/2006 |
| JP | 2007-125944 | 5/2007 |

OTHER PUBLICATIONS

Office Action dated Feb. 15, 2011 in corresponding Japanese Application No. 2009-118805.
Extended European Search Report and Opinion dated Dec. 30, 2010, in corresponding European Application No. 10162862.6.

* cited by examiner

*Primary Examiner* — Toan To
(74) *Attorney, Agent, or Firm* — Harness, Dickey & Pierce, PLC

(57) ABSTRACT

The control apparatus for an electric power steering system is designed to satisfy the first spec that a first relation characteristic between speed of the electric motor to generate steering assist force and the steering wheel torque is the same as a basic relation characteristic in which the electric motor is driven in accordance with a basic assist amount calculated on the basis of the measured steering torque not corrected by an assist compensation amount calculated depending on the operating state of the electric power steering system, and to satisfy the second spec that a second relation characteristic between speed of the electric motor and a road surface reaction force is such that speed of the electric motor is suppressed compared to a case where the electric motor is driven in accordance with the basic relation characteristic.

5 Claims, 5 Drawing Sheets

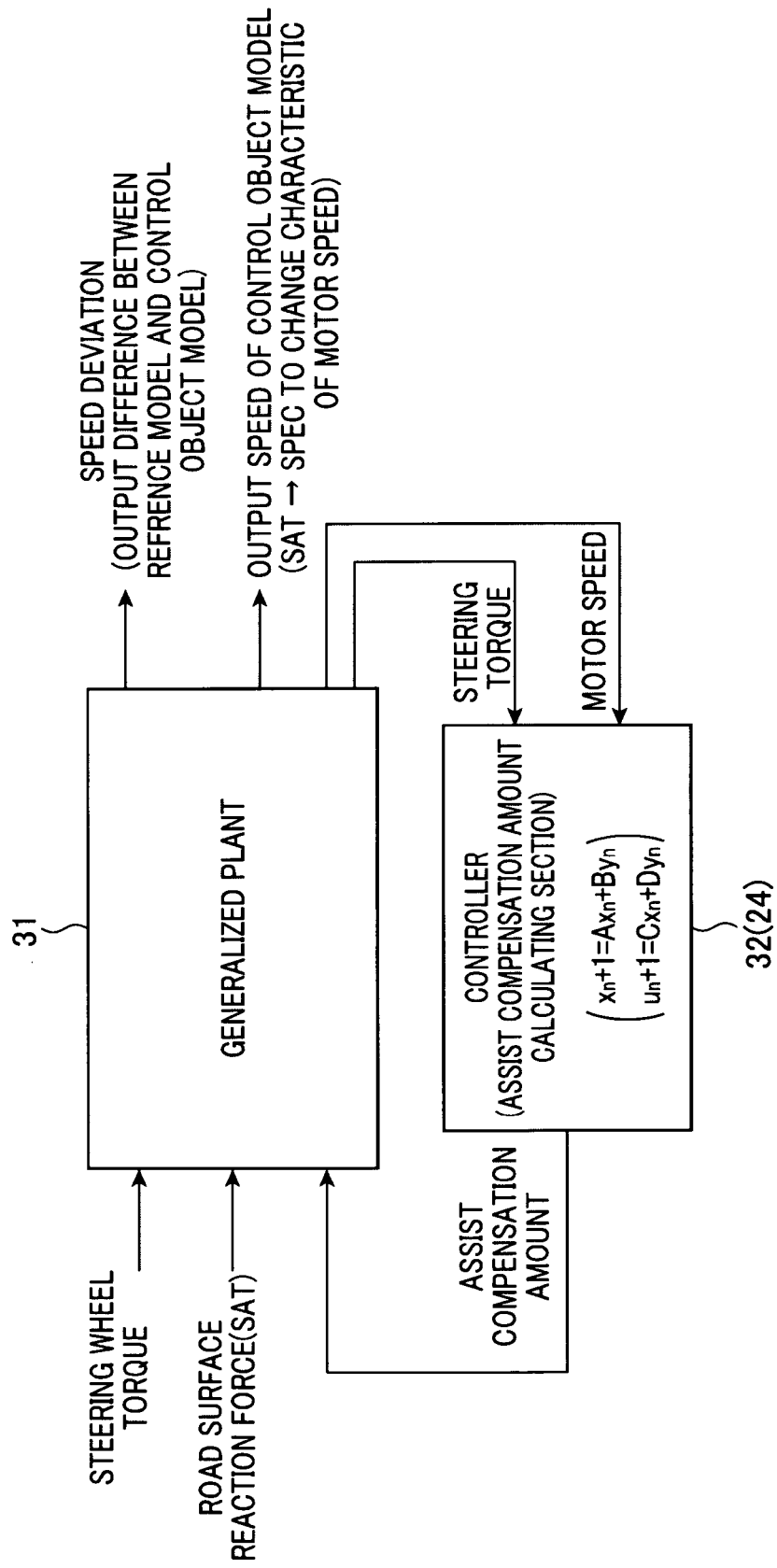

CONTROL APPARATUS FOR ELECTRIC POWER STEERING SYSTEM

CROSS-REFERENCE TO RELATED APPLICATION

This application claims priority to Japanese Patent Application No. 2009-119805 filed on May 15, 2009, the entire contents of which are hereby incorporated by reference.

BACKGROUND OF THE INVENTION

1. Field of the Invention

The present invention relates to a control apparatus for an electric power steering system which assists steering operation by a vehicle driver by means of an electric motor.

2. Description of Related Art

In an electric power steering system which assists steering operation by a vehicle driver by means of an electric motor, an EPSECU (Electric Power Steering Electronic Control Unit) calculates an assitive steering torque on the basis of steering torque caused by torque applied to a steering wheel by a vehicle driver (referred to as steering wheel torque hereinafter) and various sensor signals including a steering wheel signal and a vehicle speed signal, and drives an electric motor in accordance with the calculation result in order to generate an appropriate assistive steering force depending on steering operation by the vehicle driver.

The EPSECU drives the motor such that the assistive steering force increases as the steering torque increases as basic control. According to such basic control, the vehicle driver can turn the steering wheel lightly, because when the vehicle driver turns the steering wheel, the assistive steering force depending on the steering torque at this time is generated.

However, if the basic control alone which determines the assistive steering force in accordance with the steering torque is performed, vehicle convergence is degraded due to road surface reaction force when the steering wheel is returned. That is, when a vehicle is running with its steering wheel being turned, there occurs torque (SAT; Self Aligning Torque) which acts to move the tire wheels of the vehicle to move to the straight forward direction of the vehicle. Accordingly, the steering wheel is moved back strongly, as a result of which the vehicle convergence is degraded.

To remove such problem, it is known to provide the electric power steering system with a damping control function which controls the rotation of the motor such that the motor is more suppressed from rotating when the motor speed (that is, the turning speed of the steering wheel) is higher. The damping control is control to alter, depending on the motor speed, the characteristic of the basic control which determines the assistive steering force in accordance with the steering torque. According to this damping control, the returning operation of the steering wheel involves a feeling of stickiness, and the vehicle convergence is improved, since the steering wheel returns slowly even when the road surface reaction force affects the steering wheel to move rapidly.

FIG. 4 is a diagram showing a conventional electric power steering system 100 having the damping control function. The electric power steering system 100 assists vehicle driver's operation of a steering wheel 2 by means of an electric motor 6. The steering wheel 2 is fixed to one end of a steering shaft 3 the other end of which is connected with one end of a torque sensor 4. The torque sensor 4 is connected to an intermediate shaft 5 at the other end thereof.

The torque sensor 4 is a sensor for measuring steering torque. In more detail, the torque sensor 4 includes a torsion bar coupling the steering shaft 3 to the intermediate shaft 5, and measures torque applied to the torsion bar on the basis of the torsion angle of the torsion bar.

The motor 6, which is for assisting the steering force of the steering wheel 2, is provided with a worm gear at the distal end of its rotation shaft, the worm gear being engaged with a worm wheel provided in the intermediate shaft 5 so that the rotation of the motor 6 is transmitted to the intermediate shaft 5. Conversely, when the intermediate shaft 5 is rotated by operation of the steering wheel 2 or reaction force from a road surface 12, the rotation of the intermediate shaft 5 is transmitted to the motor 6 to cause the motor 6 to rotate.

The motor 6 is a brushless DC motor having a rotation sensor disposed thereinside so as to be capable of outputting a signal indicative of the rotational speed (rotational angular velocity) of the motor 6.

The other end of the intermediate shaft 5 opposite to the one end to which the torque sensor 4 is fitted is connected to a steering gear box 7. The steering gear box 7 constitutes a gear mechanism including a rack and a pinion gear (not shown). The teeth of the rack are engaged with the pinion gear provided in the other end of the intermediate shaft 5. Accordingly, when the vehicle driver turns the steering wheel 2, since the intermediate shaft 5 rotates and accordingly the pinion gear rotates, the rack moves rightward or leftward. The rack is fitted with a tie rod 8 at each end thereof. The tie rods 8 move leftward or rightward together with the rack. As a result, since each of the tie rods 8 pulls or pushes a knuckle arm 9 disposed ahead of the tie rod, the direction of the tire 10 can be changed.

A vehicle sensor 11 is mounted on a predetermined portion of the vehicle to measure the vehicle speed. In the above described structure, when the vehicle driver turns the steering wheel 2, the rotation of the steering wheel 2 is transmitted to the steering gear box 7 through the steering shaft 3, torque sensor 4; and intermediate shaft 5. Further, the rotation of the intermediate shaft 5 is converted into side-to-side motion of the tie rods to steer the tires 10 on the left or right sides.

The EPSECU 110, which is powered by the electricity from a vehicle battery (not shown), calculates an assistive steering force on the basis of the steering torque measured by the torque sensor 4, the motor speed of the motor 6, and the vehicle speed measured by the vehicle speed sensor 11. The motor 6 is driven in accordance with the calculation result to appropriately control the assist amount for the force to move the steering wheel 2 (and accordingly the force to steer the tires)

In more detail, the EPSECU 110 is constituted of a basic assist amount calculating section 111 to calculate a basic assist amount, a damping control section 114 to calculate a damping compensation amount, an adding section 113 which adds the basic assist amount and the damping compensation amount to calculate an assist command value, and a motor drive circuit 112 to drive the motor 6 in accordance with the assist command value received from the adding section 113.

The basic assist amount calculating section 111 calculates the basic assist amount on the basis of the steering torque measured by the torque sensor 4 and the vehicle speed measured by the vehicle speed sensor 11. In more detail, the basic assist amount calculating section 111 calculates, by use of a steering torque-basic assist amount map, for example, the basic assist amount such that as the steering torque increases, the basic assist amount increases (that is, the torque to assist the steering wheel 2 to move increases), and as the vehicle speed increase, the basic assist amount decreases.

The damping control section 114 calculates the damping compensation amount on the basis of the motor speed to compensate the basic assist amount calculated by the basic assist amount calculating section 111. In more detail, the damping control section 114 calculates the damping compensation amount such that as the motor speed increases (that is, as the steering wheel 2 movers more rapidly), the motor speed is more suppressed (that is, the movement of the steering wheel 2 is more suppressed). Since various methods for performing the damping control in the electrical power steering system have been proposed and put to practical use, explanation of such methods is omitted here.

The motor drive circuit 112 supplies the motor 6 with a current in accordance with the assist command value obtained by adding the basic assist amount and the damping correction amount, in order to drive the motor 6. The assist command value inputted to the motor drive circuit 112 is the basic assist amount which has been compensated by the damping compensation amount. Accordingly, when the vehicle driver operates the steering wheel 2 to move more rapidly, or when the road surface reaction force causes the tires 10 to return to the straight forward direction more rapidly (that is, the steering wheel 2 is caused to move back to its neutral position more rapidly), the movement of the steering wheel 2 is more suppressed.

Other than the above, the EPSECU 110 includes various functional blocks such as a phase compensation section to improve the stability of the basic assist amount, a feedforward control section to improve response to variation of the steering torque, and a feedback control section to determine the current command value to be given to the motor drive circuit 112 by means of feedback control (PI control, for example) on the deviation between the assist command value and the actual current of the motor 6. However, they are omitted from FIG. 4 for ease of explanation.

The electric power steering system 100 having the above described structure is capable of giving a feeling of stickiness to rapid movement of the steering wheel 2 because of the provision of the damping control function. Accordingly, the electric power steering system 100 can improve the returning characteristic (returning feeling) of the steering wheel 2, and accordingly improve the vehicle convergence compared to other conventional electric power steering systems not having the damping control function.

However, on the other hand, such a damping control has a disadvantage that it may disturb the vehicle driver's operation of the steering wheel 2.

That is, since the damping control operates to suppress the movement of the steering wheel 2 when it is caused to move rapidly, the steering wheel 2 is suppressed from moving back rapidly when the steering wheel 2 is returned. However, the steering wheel 2 moves only slowly also when the vehicle driver tries deliberately to turn the steering wheel 2 sharply. That is, in this case, vehicle driver's operation of the steering wheel 2 is disturbed.

This is explained in further detail with reference to FIGS. 5A and 5B. FIG. 5A is a Bode diagram showing the frequency characteristic of the motor speed with respect to steering wheel torque, and FIG. 5B is a Bode diagram showing the frequency characteristic of the motor speed with respect to road surface reaction force of the electric power steering system 100 shown in FIG. 4.

As shown in FIG. 5B, the motor speed with respect to the road surface reaction force in the case where the damping control is provided is lower (especially in the range circled by the dotted line) than that in the case where the damping control is not provided and the motor 6 is driven only in accordance with the basic assist amount. That is, the motor speed is suppressed in the presence of road surface reaction force by the damping control. According to the above characteristic, the steering wheel 2 is suppressed from returning rapidly due to road surface reaction force, to thereby improve the vehicle convergence.

As shown in FIG. 5A, also the motor speed with respect to the steering wheel torque in the case where the damping control is provided is lower (especially in the range circled by the dotted line) than that in the case where the damping control is not provided and the motor 6 is driven only in accordance with the basic assist amount. That is, the motor speed is suppressed also when the vehicle driver turns the steering wheel 2. According to the above characteristic, the movement of the steering wheel 2 is more suppressed when the vehicle driver operates the steering wheel 2 to steer more sharply.

The foregoing patent document 1 discloses reducing the feeling of the steering wheel being forcibly moved back to the neutral position when the steering wheel is returned, while maintaining the feeling of the steering wheel being smoothly turned from the neutral position by making improvement to the damping control function.

In short, the technique disclosed in the patent document 1 is to adjust the damping compensation amount in accordance with the road surface reaction force (may be referred to as SAT hereinafter), and a signal indicative of distinction between turning and returning of the steering wheel. That is, the damping compensation amount is varied depending on the estimated value of the SAT such that the damping compensation amount increases to decrease the motor speed as the SAT increases. According to this technique, when the SAT is small, for example, when the steering wheel starts to be turned, since the damping compensation amount is small, the vehicle driver's operation of the steering wheel is less disturbed.

However, although the vehicle driver's operation of the steering wheel is less disturbed when the steering wheel starts to be turned, since the SAT occurs inevitably when the steering wheel is turned, the damping control operates more or less depending on the estimated value of the SAT. Accordingly, when the vehicle driver starts to turn the steering wheel, the damping control operates more or less to disturb the operation of the vehicle driver.

The SAT increases as the vehicle driver steers more rapidly. Accordingly, when the vehicle driver turns the steering wheel widely, since the estimated value of the SAT becomes large, the movement of the steering wheel (the rotation of the motor) is disturbed to a large extent.

Hence, even according to the technique described in patent document 1, when the steering wheel is turned, the damping compensation amount is calculated to a value corresponding to the estimated value of the SAT although it may be small, as a result of which the driver's operation is disturbed.

In addition, the technique described in patent document 1 needs to estimate the SAT. Since the control accuracy of the system depends on the accuracy of estimating the SAT, it is necessary to estimate the SAT with a sufficiently high degree of accuracy to enable the system to operate reliably. However, estimating the SAT with a sufficiently high degree of accuracy requires a complicated circuit, which increases the manufacturing cost.

In addition, the technique described in patent document 1 distinguishes between turning and returning of the steering wheel, and changes the gain of the control in accordance with the result of the distinction. Accordingly, there may occur a case in which the vehicle behavior feels unnatural when the vehicle driver turns or returns the steering wheel, because the gain changes at this time. Further, when the vehicle driver intricately operates the steering wheel, it may not be possible to accurately distinguish between the turning and returning of the steering wheel.

As explained above, even according to the technique described in patent document 1, it is intrinsically impossible that the damping control operates only when the steering wheel is returned to improve the vehicle convergence, so that the vehicle driver's operation of the steering wheel is not disturbed.

SUMMARY OF THE INVENTION

The present invention provides a control apparatus for an electric power steering system, the electric power steering system including:

an input shaft coupled to a steering wheel of a vehicle so as to rotate together with the steering wheel by steering wheel torque applied when the steering wheel is operated;

a rotation transmitting section to transmit rotation of the input shaft to travel wheels of the vehicle to steer the travel wheels;

a torque sensor to measure steering torque due to torsion between the input shaft and the travel wheels; and an electric motor to generate assist steering force to assist operation of the steering wheel to steer the travel wheels, the control apparatus comprising:

a basic assist amount calculating section to calculate a basic assist amount on the basis of the steering torque measured by the torque sensor;

an assist compensation amount calculating section to calculate an assist compensation amount;

an assist amount correcting section to calculate a corrected assist amount by correcting the basic assist amount calculated by the basic assist amount calculating section by the assist compensation amount calculated by the assist compensation amount calculating section; and a motor drive section to drive the electric motor in accordance with the corrected assist amount received from the assist amount correcting section to assist the operation of the steering wheel;

wherein the assist compensation amount calculating section calculates the assist compensation amount on the basis of at least two signals of different kinds each of which reflects an operating state of the electric power steering state such that the following first and second specs (a) and (b) are satisfied.

(a) A first spec that a first relation characteristic between speed of the electric motor and the steering wheel torque is the same as a basic relation characteristic in which the electric motor is driven in accordance with the basic assist amount not corrected by the assist compensation amount.

(b) A second spec that a second relation characteristic between speed of the electric motor and a road surface reaction force is such that speed of the electric motor is suppressed compared to a case where the electric motor is driven in accordance with the basic relation characteristic.

According to the present invention, there is provided an electric power steering system for a vehicle capable of not disturbing the vehicle driver's operation to turn the steering wheel, and reducing feeling of the steering wheel being forcibly and rapidly moved back when the vehicle driver returns the steering wheel.

Other advantages and features of the invention will become apparent from the following description including the drawings and claims.

BRIEF DESCRIPTION OF THE DRAWINGS

In the accompanying drawings:

FIG. 2 is an explanatory view explaining a method of designing a controller (an assist compensation amount calculating section) included in the control apparatus of the embodiment;

PREFERRED EMBODIMENTS OF THE INVENTION

Figure 1:
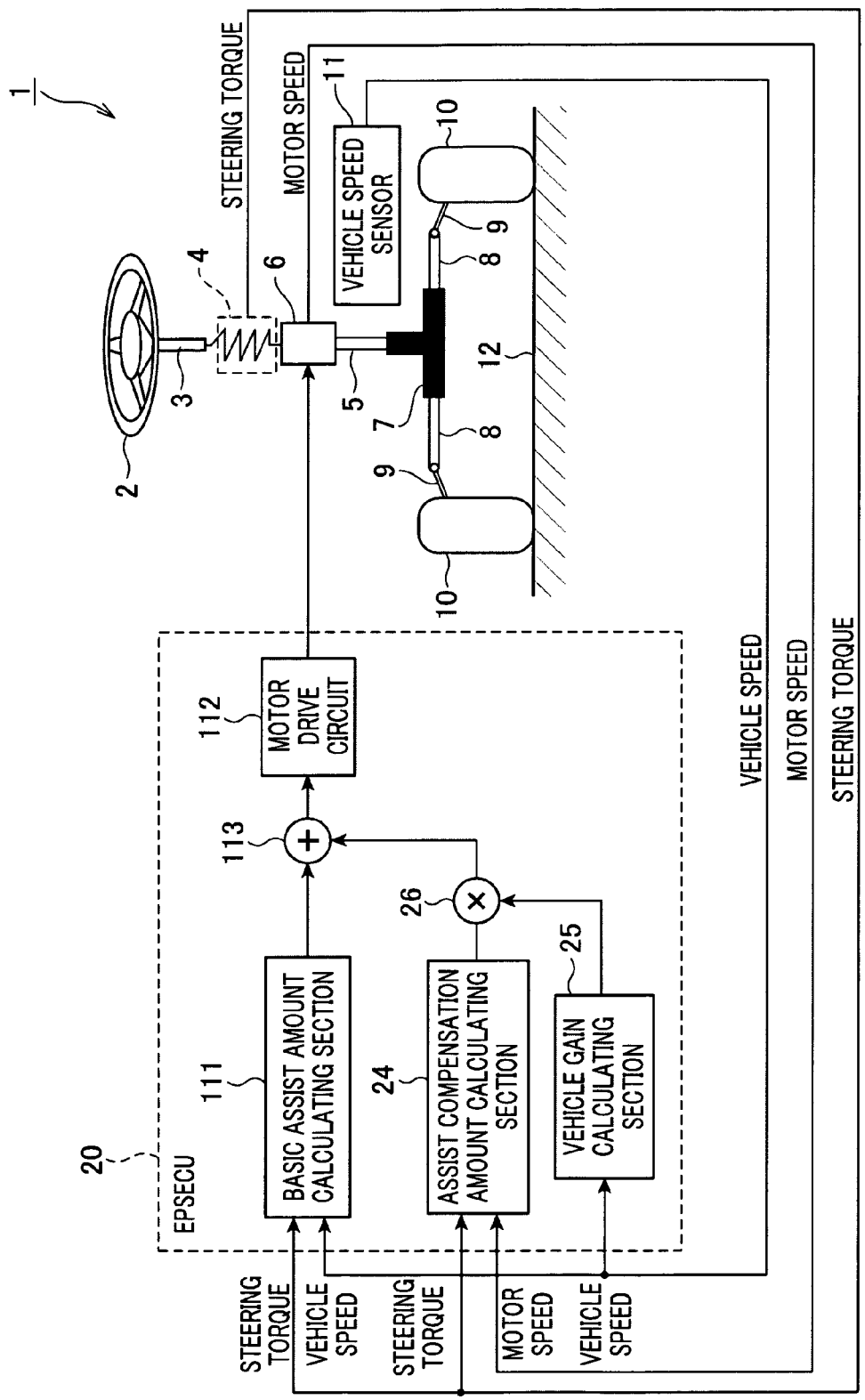
FIG. 1 is a diagram showing the schematic structure of an electric power steering system including a control apparatus according to an embodiment of the invention.
Figure 4:
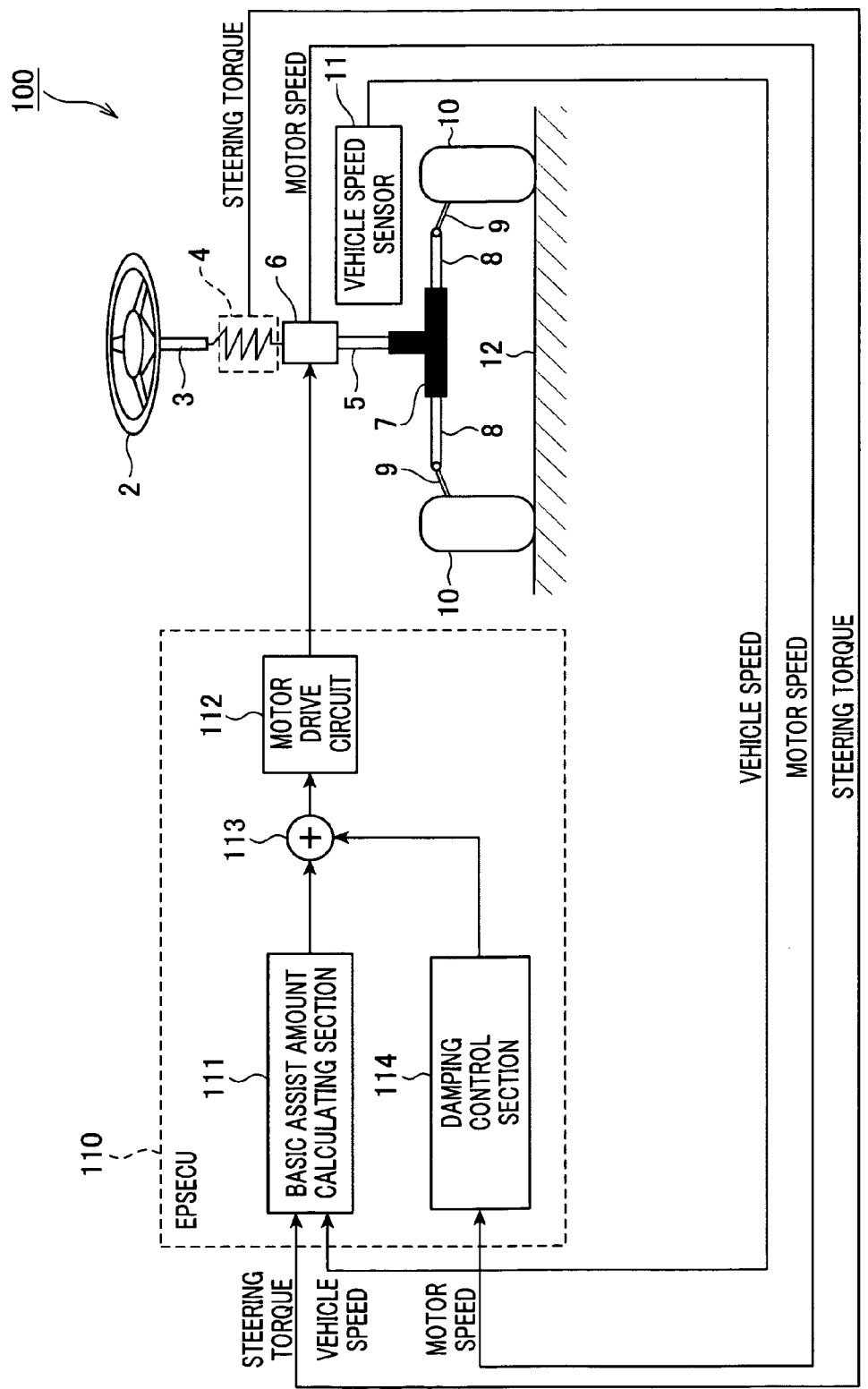
FIG. 4 is a diagram showing the schematic structure of the conventional electric power steering system.

FIG. 1 is a diagram showing the schematic structure of an electric power steering system 1 including a control apparatus according to an embodiment of the invention. In FIG. 1, the reference numerals or characters identical to those in FIG. 2 represent the same elements. As shown in FIG. 1, the mechanical structure as a rotation transmitting section of the electric power steering system 1 of this embodiment which couples the power steering 2 to the tires 10 as travel wheels by way of the steering shaft 3 as an input shaft, steering shaft torque sensor 4, motor 6, intermediate shaft 5, steering gearbox 7, tie rods 8, knuckle arms 9 is the same as that of the conventional electric power steering system 100 explained with reference to FIG. 4.

Also, the EPSECU 20 included in the electric power steering system 1 of this embodiment is the same as the EPSECU 100 included in the conventional electric power steering system 100 in that they both include the basic assist amount calculating section 111 to calculate the basic assist amount, adding section 113 and motor drive circuit 112.

Accordingly, the description of the electric power steering system 1 of this embodiment is focused on difference with the conventional electric power steering system 100, that is, focused on the structure of the EPSECU 20.

As shown in FIG. 1, the EPSECU 20 of the electric power steering system 1 includes, other than the basic assist amount calculating section 111 to calculate the basic assist amount, an assist compensation amount calculating section 24 to calculate an assist compensation amount, a vehicle speed gain calculating section 25 to calculate a vehicle speed gain, and a multiplying section 26 to calculate a vehicle-speed-corrected compensation amount by multiplying the assist compensation amount and the vehicle speed gain.

The assist compensation amount calculating section 24 is provided to compensate the basic assist amount calculated by the basic assist amount calculating section 111. Also in the conventional electric power steering system 100, the basic assist amount is corrected by the damping compensation amount calculated by the damping control section 114, however, this correction is carried out both when the vehicle driver turns the steering wheel 2 and when the vehicle driver returns the steering wheel 2 in the same way.

Figure 5A:
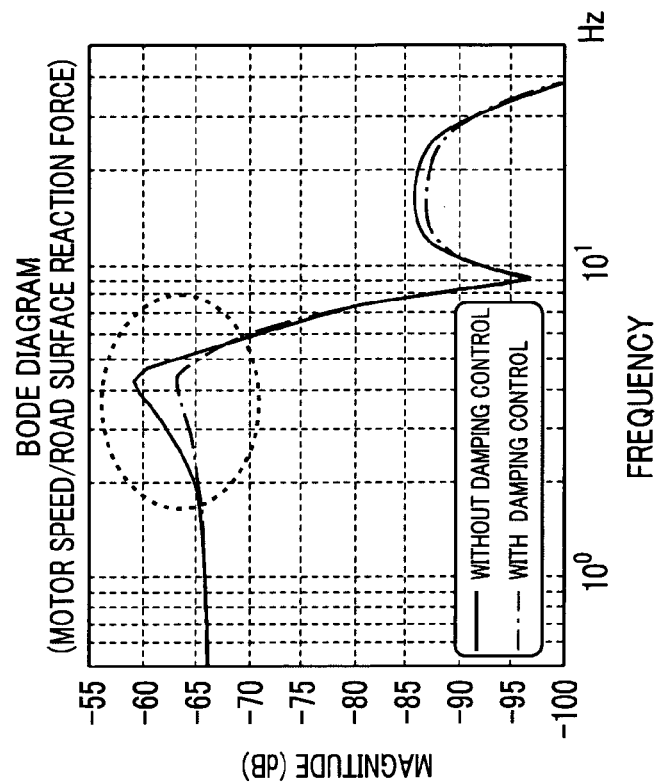
FIG. 5A is a Bode diagram showing the frequency characteristic (motor speed-steering wheel torque characteristic) of each of the electric power steering system of this embodiment and the conventional electric power steering system.

That is, as explained with reference to FIGS. 5A and 5B, according to the conventional damping control, the motor speed is suppressed more in accordance with the motor speed-steering wheel torque characteristic shown in FIG. 5A and motor speed-SAT characteristic shown in FIG. 5B than by the basic assist amount alone.

On the other hand, according to the control by this embodiment in which the basic assist amount is corrected by the assist compensation amount (may be referred to as "convergence control" hereinafter), the motor speed-SAT characteristic is equivalent to that in the conventional system having the damping control, however, the motor speed-steering wheel torque characteristic is set so as not to deviate or deviate very slightly from the one based on the basic assist amount alone.

Next, explanation is given to the structure and design concept of the assist compensation amount calculating section 24. The inventors of the present invention studied various different ways to find out a possible control scheme which does not degrade operation feeling when the steering wheel is turned, and suppresses the steering wheel from being rapidly moved back to the neutral position when the steering wheel is returned. As the result, the inventors have found that such a control scheme can be implemented by a control mechanism which satisfies a first spec that the motor speed-steering wheel torque characteristic accords to the basic characteristic determined according to the basic assist amount alone, and a second spec that the motor speed-SAT characteristic is varied from the basic characteristic to suppress the motor speed by the damping control. That is, the inventors have found that excellent vehicle convergence both when the steering wheel is turned and when the steering wheel is returned can be realized by satisfying the first and second specs.

Further, the inventors have found that to satisfy the first and second specs different from each other, it is necessary to acquire at least two signals of different kinds each reflecting the operation and behavior of the electric power steering system 1, and to provide a 2-input and 1-output controller which calculates the assist compensation amount on the basis of the two signals.

This is because it is difficult to satisfy the first and second specs by use of a single signal reflecting the operation and behavior of the electric power steering system 1 and being inputted to a 1-input and 1-output controller, but it is possible to satisfy the first and second specs at the same time by use of two or more signals each reflecting the operation and behavior of the electric power steering system 1 and being inputted to a multiple-input controller.

There are various methods to design a 2-input and 1-output controller. However, in view of that the first and second specs have to be worked into the 2-input and 1-output controller during the system design phase, and the 2-input and 1-output controller has to be capable of shaping its closed-loop frequency characteristic, the controller (the assist compensation amount calculating section 24) is designed based on H-infinity control theory in this embodiment.

According to the H-infinity control theory, it is possible to design a multiple-input and multiple-output controller whose closed-loop frequency characteristic (the Bode diagram) is shapable. The assist compensation amount calculating section 24 of this embodiment is designed according to well known conventional technique based on the H-infinity control theory. Accordingly, the detailed design method and design process are omitted from explanation, and only their outlines are explained with reference to FIG. 2.

FIG. 2 is an explanatory view schematically explaining a method of designing the controller 32 (the assist compensation amount calculating section 24). As shown in FIG. 2, to design the controller 32 based on the H-infinity control theory, a generalized plant 31 is set.

In designing a controller based on the H-infinity control theory, it is well known that a generalized plant is set, the inputs to the generalized plant includes at least one external disturbance input and at least one operation input outputted from the controller, and the outputs from the generalized plant includes at least one control output and at least one observation output inputted to the controller.

As shown in FIG. 2, in this embodiment, the steering wheel torque and the SAT are inputted to the generalized plant 31 as external disturbance inputs, the assist compensation amount is inputted to the generalized plant 31 as an operation input outputted from the controller 32, and the steering torque and the motor speed are inputted to the controller 32 as observation outputs outputted from the generalized plant 31. The generalized plant 31 outputs a speed deviation and a control-object-model output speed as control outputs.

The speed variation outputted as a control output is a value indicative of variation between the motor speed (the first spec) outputted from a reference model in response to the steering wheel torque, and the motor speed (the second spec) outputted from a control object model in response to the steering wheel torque, SAT and assist compensation amount. The control-object-model output speed is the motor speed (the second spec) outputted from the control object model weighted by a predetermined value.

The reference model and the control object model are well known as models set in a generalized plant in the H-infinity control. In this embodiment, a 3-inertia model which outputs the motor speed in response to the steering wheel torque and SAT inputted thereto is set as the control object model.

In setting the generalized plant 31, the characteristic of the basic assist amount calculating section 111 to calculate the basic assist amount is sufficiently taken into account. As explained above, in this embodiment, the controller 32 is designed by setting the generalized plant 31 which satisfies both the first spec defining the frequency characteristic in accordance with the characteristic of the basic assist amount calculating section 111 and not changed from the basic frequency characteristic characterized by the basic assist amount alone, and the second spec defining the frequency characteristic changed from the basic frequency characteristic, and by performing computation in accordance with the algorithm of the H-infinity control. Various computation methods and computation tools can be used for the computation. For example, the well known MATLAB may be used.

The thus designed controller 32 (the assist compensation amount calculating section 24) is represented by the following state equation (1).

$$\left.\begin{array}{l}x_{n+1} = Ax_n + By_n \\ u_{n+1} = Cx_n + Dy_n\end{array}\right\} \quad (1)$$

In the above state equation (1), $u_{n+1}$ is the operation input (the assist compensation amount), $y_n$ is the observation output (the steering torque and motor speed), and each of $x_n$ and $x_{n+1}$ is an internal variant (state amount). In short, designing the controller 32 means calculating the respective parameters A, B, C and D in the above state equation (1).

By carrying out the controller designing based on the H-infinity control theory as described above, the assist compensation amount calculating section 24 represented by the state equation (1) can be obtained. Although the state equation (1) is an equation in a discrete-time system, it is not limited thereto.

In this embodiment, the steering torque and the motor speed are inputted to the assist compensation amount calculating section 24 as at least two signals of different kinds. The reason why is described below.

It is basically possible to calculate the assist compensation amount by use of two or more signals each reflecting the operation (behavior) of the electric power steering system 1. The steering torque, which is one of such signals, reflects the operating state of the steering wheel 2 by the vehicle driver. The motor speed, which is also one of such signals, reflects the operating state of the steering wheel 2 by the vehicle driver and also the effect of the SAT. Using these two signals makes it possible to distinguish whether the motor is rotating in accordance with the vehicle driver's operation of the steering wheel 2, or due to the SAT.

Since the control system capable of reliably performing the convergence control satisfying the above first and second specs can be implemented by use of these two signals, in this embodiment, the controller (the assist compensation amount calculating section 24) is designed to receive these two signals and output the assist compensation amount.

The assist compensation amount calculated by the assist compensation amount calculating section 24 may be directly inputted to the adding section 113. However, in this embodiment, the assist compensation amount is multiplied by the vehicle speed gain calculated by the vehicle speed gain calculating section 25 at the multiplying section 26, and the result of the multiplication is inputted to the adding section 113 as the vehicle-speed-corrected assist compensation amount.

The vehicle speed gain calculating section 25 includes a map showing gain-vehicle speed characteristic to output the gain corresponding to the vehicle speed measured by the vehicle speed sensor 11. In more detail, the map shows such a relationship that the gain outputted from the vehicle speed gain calculating section 25 becomes large as the vehicle speed increases. Accordingly, the motor speed is suppressed more (returning operation of the steering wheel 2 is disturbed more) when the vehicle speed is higher.

Figure 3A:
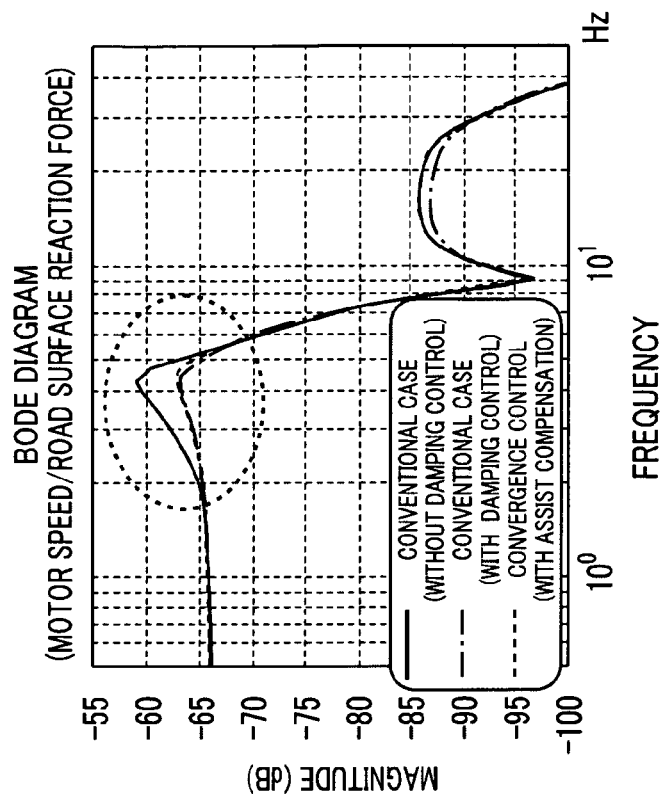
FIG. 3A is a Bode diagram showing the frequency characteristic (motor speed-steering wheel torque characteristic) of each of the electric power steering system of this embodiment and a conventional electric power steering system.
Figure 3B:
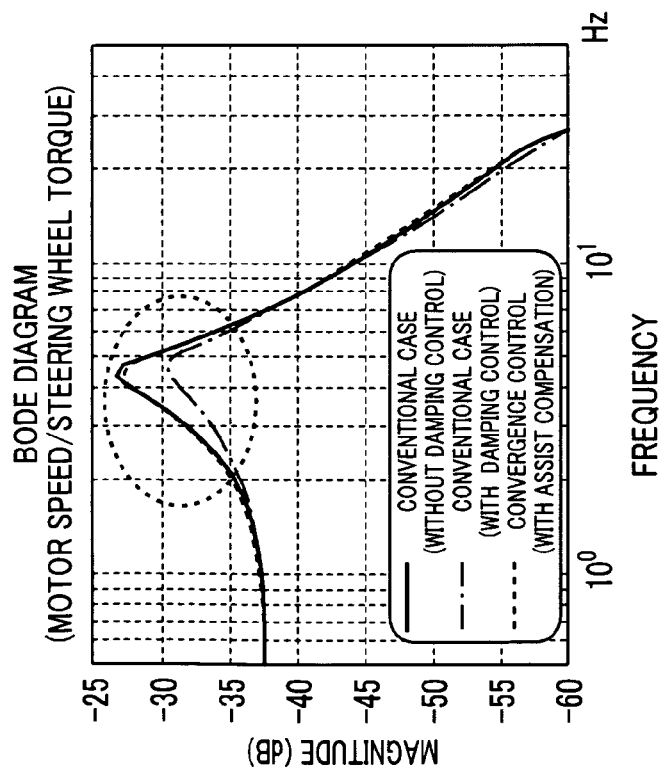
FIG. 3B is a Bode diagram showing the frequency characteristic (motor speed-road surface reaction force) of each of the electric power steering system of the embodiment and the conventional electric power steering system.

Next, an example of the frequency characteristic of the electric power steering system 1 having the above described structure is explained with reference FIGS. 3A and 3B. FIG. 3A is a Bode diagram showing the frequency characteristic (motor speed-steering wheel torque characteristic) of each of the electric power steering system 1 of this embodiment and the conventional electric power steering system 100. FIG. 33 is a Bode diagram showing the frequency characteristic (motor speed-SAT characteristic) of each of the electric power steering system 1 of this embodiment and the conventional electric power steering system 100.

Figure 5B:
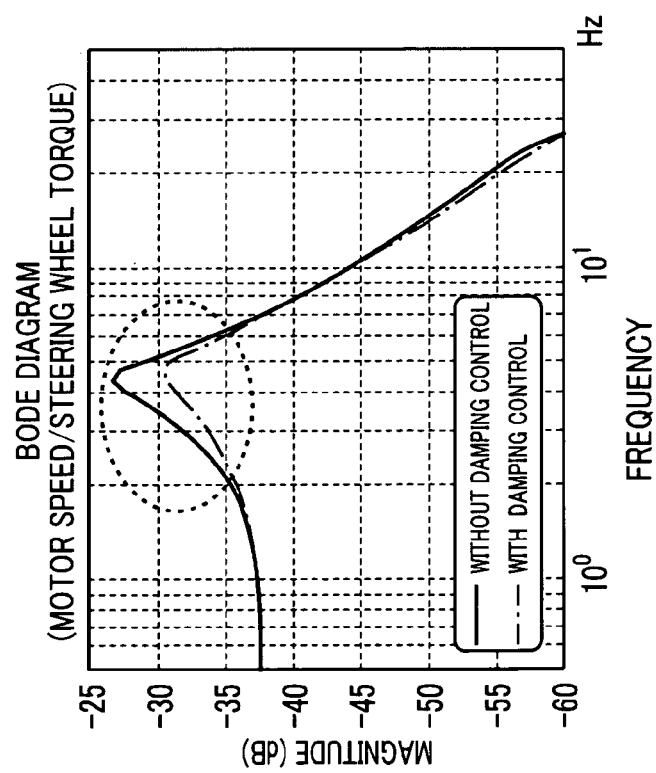
FIG. 5B is a Bode diagram showing the frequency characteristic (motor speed-road surface reaction force) of each of the electric power steering system of this embodiment and the conventional electric power steering system.

As shown in FIG. 5B, the motor speed in the case where the damping control is provided is lower (especially in the range circled by the dotted line) than that in the case where the damping control is not provided and the motor 6 is driven in accordance with the basic assist amount alone. That is, the rotation of the motor is suppressed in the presence of the SAT by the convergence control like the conventional damping control, so that the vehicle convergence is improved.

On the other hand, as shown in FIG. 3A, the motor speed-steering torque characteristic by the convergence control of this embodiment changes very little from that by the conventional control (the control depending on the basic assist amount alone). According to this embodiment, the rotation of the motor is not suppressed by the damping control when the vehicle driver turns the steering wheel 2, and the motor speed accords to the motor speed-steering torque characteristic determined by the basic assist amount alone. This makes it possible that the steering operation by the vehicle drive is not disturbed when the vehicle driver turns the steering wheel 2.

Accordingly, according to the electric power steering system 1 of this embodiment, it is possible to prevent the steering operation feeling from being impaired when the vehicle driver turns the steering wheel 2, and to reduce the feeling of the steering wheel 2 being forcibly moved back when the vehicle driver returns the steering wheel 2 to improve the vehicle convergence.

The assist compensation amount calculating section 24 for calculating the assist compensation amount is designed by use of the H-infinity control theory. The H-infinity control theory enables to design a multiple-input and multiple-output controller which can satisfy different specs (characteristics). Further, since the H-infinity control theory enables to shape the closed-loop frequency characteristic thereof, the H-infinity control theory is suitable as a method to design the controller for calculating the assist compensation amount.

In this embodiment, as the signals inputted to the assist compensation amount calculating section 24 to calculate the assist compensation amount, the steering torque and the motor speed are used. As explained in the foregoing, using these two signals makes it possible to distinguish whether the motor is rotating in accordance with the vehicle driver's operation of the steering wheel 2, or due to the SAT, and accordingly, to realize an electric power steering system capable of satisfying the two different specs.

Further, in this embodiment, the assist compensation amount is corrected in accordance with the vehicle speed gain. This makes it possible to correct the basic assist amount by the assist compensation amount appropriate to the current vehicle speed, so that the motor speed-steering wheel torque characteristic and the motor speed-SAT characteristic can be the ones determined appropriately taking account of the vehicle speed.

It is a matter of course that various modifications can be made to the above embodiment as described below.

For example, instead of the motor speed, the motor angle (angular position of the motor) may be inputted to the assist compensation amount calculating section 24. Further, the signals inputted to the assist compensation amount calculating section 24 are not limited to the steering torque and the motor speed. Any signal reflecting the operation or behavior of the electric power steering system 1 may be used as one of the two signals of different kinds.

For example, as such a signal, there may be used the rotation angle of the steering wheel 2, the rotational speed of the steering wheel 2, the torque of the intermediate shaft 5, the stroke (the lateral movement) of the rack constituting the steering gear box 7, the thrust of the rack, or the angle of the tire.

Of the above various signals, each of the steering torque, the rotational angle of the steering wheel 2 and the rotational speed of the steering wheel 2 is a signal reflecting the vehicle driver's operation, and each of the motor speed, the motor angle, the torque of the intermediate shaft 5, the stroke of the rack, the thrust of the rack and the angle of the tire is a signal reflecting the road surface reaction force or the SAT. Accordingly, to calculate the assist compensation amount by use of two or more signals of different kinds, it is more preferable to use at least one signal reflecting the vehicle driver's operation and at least one signal reflecting the SAT.

In the above embodiment, a brushless motor is used as the motor 6. However, the motor 6 may be a different type of a motor, such as a brushed motor.

In the above embodiment, the motor 6 is provided with the rotation sensor by the output of which the motor speed is measured. However, it can be determined as appropriate where the rotational sensor is disposed, and how the necessary information (the rotating state such as the motor speed and the rotation angle of the motor 6) should be acquired. Accordingly, in the case of using a brushed motor as the motor 6, the rotating state of the motor 6 may be acquired by estimating the rotating state on the basis of the current flowing through the motor 6.

Although the electric power steering system 1 of the above embodiment has the structure of the so-called shaft assist type in which the rotation of the intermediate shaft 5 is assisted by means of the motor 6, the present invention is applicable to various types of an electric power steering system, for example, of the so-called rack assist type in which the reciprocation of the tie rods 8 (the reciprocating motion of the rack within the steering gear box 7) is assisted by the motor.

The above explained preferred embodiments are exemplary of the invention of the present application which is described solely by the claims appended below. It should be understood that modifications of the preferred embodiments may be made as would occur to one of skill in the art.

What is claimed is:

1. A control apparatus for an electric power steering system,
the electric power steering system including:
an input shaft coupled to a steering wheel of a vehicle so as to rotate together with the steering wheel by steering wheel torque applied when the steering wheel is operated;
a rotation transmitting section to transmit rotation of the input shaft to travel wheels of the vehicle to steer the travel wheels;
a torque sensor to measure steering torque due to torsion between the input shaft and the travel wheels; and
an electric motor to generate assist steering force to assist operation of the steering wheel to steer the travel wheels, the control apparatus comprising:
a basic assist amount calculating section to calculate a basic assist amount on the basis of the steering torque measured by the torque sensor;
an assist compensation amount calculating section to calculate an assist compensation amount;
an assist amount correcting section to calculate a corrected assist amount by correcting the basic assist amount calculated by the basic assist amount calculating section by the assist compensation amount calculated by the assist compensation amount calculating section; and
a motor drive section to drive the electric motor in accordance with the corrected assist amount received from the assist amount correcting section to assist the operation of the steering wheel;
wherein the assist compensation amount calculating section calculates the assist compensation amount on the basis of at least two signals of different kinds each of which reflects an operating state of the electric power steering state such that the following first and second specs (a) and (b) are satisfied;
(a) A first spec where a relation characteristic between speed of the electric motor and the steering wheel torque is the same as a basic relation characteristic in which the electric motor is driven in accordance with the basic assist amount not corrected by the assist compensation amount;
(b) A second spec where a relation characteristic between speed of the electric motor and a road surface reaction force is such that speed of the electric motor is suppressed compared to a case where the electric motor is driven in accordance with the basic relation characteristic.

2. The control apparatus according to claim 1, wherein the assist compensation amount calculating section calculates the assist compensation amount on the basis of at least two of rotational angle of the steering wheel, the steering torque, speed of the electric motor, rotation angle of the electric motor and operating state of the rotation transmitting section selected as the at least two signals of different kinds.

3. The control apparatus according to claim 1, wherein the at least two signals of different kinds include the steering torque, and one of the speed and rotation angle of the electric motor.

4. The control apparatus according to claim 1, wherein the assist compensation amount calculating section is configured to calculate the assist compensation amount in accordance with a predetermined state equation set to satisfy the first and second specs based on H-infinity control theory.

5. The control apparatus according to claim 1, further comprising a vehicle speed measuring section to measure speed of the vehicle, and a vehicle gain calculating section to calculate a vehicle gain having a value in accordance with the speed of the vehicle measured by the vehicle speed measuring section, and an assist compensation amount correcting section to correct the assist compensation amount calculated by the assist compensation amount calculating section by multiplying the assist compensation amount by the vehicle gain calculated by the vehicle gain calculating section.

* * * * *